United States Patent [19]

Zola

[11] 4,376,654
[45] Mar. 15, 1983

[54] AQUEOUS MULTIPHASE DISPERSIONS AND PREPARATION THEREOF

[76] Inventor: John C. Zola, 15460 Arrow Hwy., Baldwin Park, Calif. 91706

[21] Appl. No.: 906,995

[22] Filed: May 18, 1978

Related U.S. Application Data

[63] Continuation of Ser. No. 668,662, Mar. 22, 1976, abandoned.

[51] Int. Cl.$^3$ .................................................. C08L 1/02
[52] U.S. Cl. ............................... 106/163 R; 106/170; 106/193 R; 106/193 J; 106/197 C; 106/203; 106/204; 252/310; 524/13; 524/27; 524/37
[58] Field of Search .................. 106/194, 170, 163 R, 106/193 R, 193 J, 197 C, 203, 204; 252/316, 317, 310; 260/29.6 WB, 29.6 HN; 524/13

[56] References Cited

U.S. PATENT DOCUMENTS

| | | | |
|---|---|---|---|
| 3,324,068 | 6/1967 | Michaels | 260/29.6 WB |
| 3,435,009 | 3/1969 | Sellet | 260/29.6 HN |
| 3,458,328 | 7/1969 | Zola | 106/158 |
| 3,725,089 | 4/1973 | Zola | 106/170 |
| 3,806,485 | 4/1974 | Frisque | 260/29.6 WB |

*Primary Examiner*—Lorenzo B. Hayes
*Attorney, Agent, or Firm*—William C. Babcock

[57] ABSTRACT

The invention is a method of producing dispersions of aqueous globules in an aqueous medium. The aqueous phases are rendered insoluble or immiscible in one another by the presence in separate phases of colloidal ionic reactants, preferably macromolecular polyelectrolytes, which are opposite in charge. The dispersed globules are larger than colloidal dimensions, and may be as large as one-half inch or more in length. If desired, they can be separated from the continuous medium and dried as discrete particles. When one or more of the aqueous phases are different in color, the compositions are useful in producing multicolor coatings, ceramic glazes, and fibrous webs. The dispersion is unique in that each of the dispersed globules possesses such plasticity and coherence that it may be subjected to substantial shear without subdividing. The dispersion when the globules are colored may be applied to a desired surface to impart either a first or second decorative appearance thereto. The first decorative appearance is attained when some of the globules are colored differently from others, and the suspending medium is substantially clear or translucent. On application of the dispersion to a surface, due to the resilience and cohesiveness of the material defining the globules, the globules appear in a uniform spaced relationship and assume a configuration which is relatively independent of the method of application. The second decorative appearance is attained when both the globules and suspending medium are colored and different in color from one another. The pattern obtained by application is then variable in accordance with the method of deposition. When the dispersion is applied by brush or roller, inherent small variations in film thickness result in different flow patterns of globules and suspending medium, imparting a striated or mottled decorative appearance to the surface corresponding to the directional shear or geometrical configuration of the application tool.

28 Claims, No Drawings

AQUEOUS MULTIPHASE DISPERSIONS AND PREPARATION THEREOF

This is a continuation of application Ser. No. 668,662, filed Mar. 22, 1976, now abandoned.

BACKGROUND OF THE INVENTION

1. Field of the Invention

The invention relates generally to the field of aqueous dispersions of globules which comprise aqueous components. It relates, in part, to the field of multi-phase coating compositions which can be used to produce textured or multicolored coatings, ceramic glazes and fibrous webs, and on volatilization to produce dry granules.

2. Description of the Prior Art

Dispersions of macro size aqueous globules have been made previously by incorporating a hydrophilic colloid in a first aqueous phase, and incorporating in a second aqueous phase one or more insolubilizing agents for said colloid which render it insoluble in the second aqueous phase. Means for doing this are disclosed in U.S. Pat. Nos. 3,458,328, 3,725,089, and 3,852,076.

In prior art the reactions responsible for insolubilization have been either exclusively or predominantly either noncolloidal or nonionic in character, or both.

By "noncolloidal" reactions I mean those in which at least one of the reactants is noncolloidal in nature. For example, the reaction between galactomannoglycans such as guar gum or locust bean gum and water soluble borates is noncolloidal because water soluble salts are not colloidal.

By "nonionic" reactions I mean those in which reactive groups of at least one of the reactants are nonionic, or in which reactive groups of both reactants bear the same kind of charge. For example, the reaction between colloidal clay and hydroxyethyl cellulose is nonionic, even though the colloidal clay is anionic.

The term "ionic reaction" as used herein refers to one in which both reactants are ionic and opposite in charge. For example, reactions beteen cationic and anionic colloids are ionic.

There are inherent strength limitations in membranes or matrices formed by means of nonionic reactions, since they are dependent on intermolecular forces which are relatively weak compared to ionic forces. Where the dispersions are subject to high shear forces as in brushing or high pressure spraying, it is desirable to provide globules which can withstand such forces without breaking, yet have relatively fluid or pliable characteristics.

There are limitations also with respect to insolubilization by means of noncolloidal reactions. The effect of salts or other noncolloidal compounds on organic colloids is generally to form poorly hydrated flocculates rather than flowable globules. In the few cases where hydrous gels are formed, there is a tendency for the reaction to propagate throughout the interior of the insolubilized globules, and the degree of gelation is difficult to control.

Globules of superior strength and desired fluidity are produced in the present invention by means of reactants which are both colloidal and ionic. It is believed that improved properties result from the ability of such materials to react strongly and primarily at the interface when this is required, or by the desired degree of reaction throughout the globule.

Globule characteristics are particularly significant in dispersions intended for coating applications. Several kinds of dispersions have been found acceptable for spray application, but deficient in application by brush or roller. Inadequacy in this respect has generally been due to one or more of the following:

(a) inadequate resistance of globules to breakdown on shear, (b) hard, gelatinous, or brittle consistencies of globules which give low surface drag and tendency to skid on smooth surfaces, (c) inadequate separation of globules which aggravates skidding tendencies. This often results from interchange between dispersed and continuous phases, making it difficult to retain required viscosity and flow characteristics in the continuous phase.

By use of reactants which are both colloidal and ionic, the present invention makes possible a better separation of aqueous phases, with better control over both phases in order to provide the desired viscosity, globule size, strength and consistency, and coating application properties.

When somewhat similar materials have appeared in the prior art, it is clear that their significance has not been recognized. For example, the use of two ionic colloids of the same charge does not suggest the present invention. The use of ionic colloids of low molecular weight as thickeners does not suggest the present use, since optimum results are dependent on the use of ionic colloids of high molecular weight and superior reactivity. Some of these have only recently become commercially available. Likewise the present invention is not suggested by the presence of ionic reactants whose activity as insolubilizers is incidental and inadequate, with insolubilization primarily dependent on nonionic or noncolloidal reactions.

SUMMARY OF THE INVENTION

The invention produces a dispersion of globules of a first aqueous phase in a second aqueous phase. The two phases are rendered insoluble in one another by means of the presence in one phase of an anionic colloidal reactant, and in the other phase of a cationic colloidal reactant. At least the dispersed phase contains a reactant which is an aqueous macromolecular polyelectrolyte.

It is an object of the present invention to overcome limitations of the prior art by utilizing a new and distinct concept in producing aqueous dispersions of macroscopic globules.

It is another object of the invention to produce aqueous dispersions of greater stability and globule strength than those provided by the prior art.

It is still another object of the invention to produce dispersions comprising a wider variety of film formers than those which are feasible for use by means of the prior art.

It is yet another object of the invention to produce dispersions useful as multicolor or texture coating compositions which are suitable for application by brush or roller as well as spray gun.

It is still another object to produce dispersions useful in applying coatings which have a more rapid drying rate and less water sensitivity than those provided by the prior art.

It is yet another object to produce dispersions which are useful in producing multicolor ceramic glazes.

It is still another object to provide dispersions which are useful in producing multicolor webs from fibrous materials such as cellulose, asbestos, or synthetic polymer fibers.

It is yet another object to provide dispersions containing discrete globules of a waterborne material, which globules can be readily separated from said dispersion and converted by drying into a granular product which has some desired property not present in the starting material.

DESCRIPTION OF THE PREFERRED EMBODIMENT

The aqueous dispersions of the present invention result from the use of colloidal ionic reactants in both continuous and discontinuous phases. The effective ionic reactants in each phase must be opposite in charge from those of the other phase. Either the cationic or anionic phase can serve as the dispersed or continuous phase. That is, the dispersions can be either cation-in-anionic or anionic-in-cationic.

The preferred reactants are colloidal polyelectrolytes which contain many ionic groups per molecule, and can be characterized as molecular or macromolecular colloids. It is generally agreed that most natural and synthetic polymers are molecular colloids in which the colloidal particles are single large molecules. These are distinguished from micellar colloids in which the particles contain an aggregation of smaller molecules, such as soaps or synthetic detergents.

In one phase of the present dispersions it is feasible to use ionic colloids which are not polymeric. For example, colloidal clays such as hectorite or saponite can serve as an anionic reactant, and colloidally dispersed alumina as a cationic reactant. Aqueous emulsions of ionic organic polymers are also useful as reactants, such as Rhoplex PR-26, a Rohm & Haas cationic acrylic polymer emulsion. Emulsions vary considerably in particle size, but generally comprise particles which are near the borderline of the range assigned to colloidal materials. In the present context, emulsions of ionic compounds have a very large surface area for potential reactivity, and can reasonably be considered as ionic colloids. Both inorganic colloids and ionic organic emulsions are preferably used in conjunction with water soluble or molecularly dispersible macromolecular polyelectrolytes of the same ionic type.

As used herein, the term polyelectrolyte refers to substantially water soluble or colloidally dispersible polymers, and not to the granular, insoluble resins used for ion exchange processes.

The ionic colloid in each phase should be predominantly either anionic or cationic, rather than an evenly divided amphoteric electrolyte. As explained hereinafter, however, it is often useful to employ in a single phase both a major portion of an ionic colloid of one type of charge and a minor portion of an ionic colloid of the opposite type of charge.

THE COLLOIDAL IONIC REACTANTS

The macromolecular polyelectrolytes which are most effective as reactants are those of very high molecular weight which produce viscous solutions at concentrations of less than 10%, and often at concentrations of 1-2%. These are well known in paint technology as well as many other fields, and are often used as thickeners for aqueous compositions.

Other macromolecular polyelectrolytes which are useful as reactants are those which are high in molecular weight, but provide solutions of moderate viscosity at concentrations of about 10-60%. Some of these, for example, are the water thinnable oil modified polyester coatings. Others are polymeric surfactants, such as the naphthalene sulfonic acid condensates. Polyelectrolytes of this kind are often strongly reactive. Generally, however, it is preferable to use them in conjunction with high viscosity macromolecular colloids which help to maintain good hydration of the reaction product.

Anionic macromolecular polyelectrolytes include, without limitation thereto, sulfonated, sulfated, or carboxylated polymers such as sulfonated polystyrene, sulfonated polyvinyl toluene, sulfonated benzene or naphthalene formaldehyde condensates, sulfated cellulose, carboxylated cellulose, carboxylated vinyl polymers, carboxylated acrylic polymers, water soluble polyesters, maleinized oils, maleinized esters of styrene-allyl alcohol copolymers, etc. Carboxylated cellulosics which can be used include carboxyalkyl cellulosics such as carboxymethyl cellulose, and carboxyalkyl hydroxyalkyl cellulosics such as carboxymethyl hydroxypropyl cellulose.

Either linear or cross-linked polymers can be used. In many instances superior results are obtained by using more than one kind of anionic reactant, such as a combination of sulfonated and carboxylated polymers, or high viscosity and low viscosity polymers, or linear and cross-linked polymers.

Anionic colloids containing sulfonic or sulfate groups are typically more reactive than those containing carboxyl groups. When maximum globule strength is required, it is preferable that the anionic reactants should include a sulfonated colloid such as sulfonated polystyrene, exemplified by the Versatl polymers of National Starch. Among carboxyl containing polymers, the preferred types include carboxymethyl cellulose and carboxyl containing acrylic polymers such as the Acrysol polymers of Rohm & Haas.

Cationic macromolecular polyelectrolytes are preferably strong base polymers, as exemplified by quaternary ammonium compounds, rather than weak base polymers such as those comprising primary, secondary, or tertiary amine groups. In general the preferred cationic polymers comprise onium compounds. These are defined in Hackh's Chemical Dictionary (4th edition) as being of the type "$RXH_y$. An organic isolog of ammonium containing the element X in its highest positive valency ..." They include, for example, quaternary ammonium, phosphonium, arsonium, and stibonium compounds, where X is pentavalent; ternary sulfonium, oxonium, and stannonium compounds, where X is tetravalent; and iodonium compounds, where X is trivalent. Quaternary ammonium compounds include those derived from heterocyclic bases, such as pyridinium, quinolinium, piperidinium, and morpholinium compounds, as well as aliphatic types.

More specifically, the preferred cationic reactants are oxonium derivatives, such as quaternary ammonium derivatives of macromolecular colloids, including the derivatives of polysaccharides such as cellulose, starch, carrageenan, agar, and natural gums, and derivatives of synthetic polymers such as polyvinyl pyrrolidone, polyvinyl alcohol, epoxy and acrylic polymers. The cationic derivatives of cellulose are particularly advantageous, such as the Polymer JR resins of Union Carbide Corporation.

Globule characteristics such as strength and consistency are largely determined by the polyelectrolytes used as reactants, including such factors as their molecular weight, concentration, type of ionic groups, and proportion of ionic groups to nonionic hydrophilic groups. Globule strength is enhanced by using polymers of higher molecular weight, more reactive groups, and fewer nonreactive groups, but only insofar as this can be done without losing good hydration, as discussed hereinafter.

As colloidal ionic reactant in the continuous phase, one may also use a charge bearing inorganic colloid such as colloidal clay. Clays which are particularly useful for this purpose include the group of clays which has been denoted by various generic names as montmorillonites, montmorillonoids, or smectites. These minerals are characterized by the tendency to swell by absorbing water between adjacent crystal layers, and to split into charged fragments capable of forming colloidal sols. This group includes the minerals montmorillonite, beidellite, saponite, stevensite, nontronite, and hectorite. Synthetic clays have been found particularly advantageous and generally superior to the corresponding natural or refined minerals. Synthetic minerals resembling hectorite are produced by Laporte Industries under the name of Laponite. Synthetic minerals resembling hectorite and saponite have been produced by Baroid Division of NL Industries, Inc. Macaloid is a refined natural hectorite marketed by Baroid Division, NL Industries, and Veegum is a refined natural saponite produced by R. T. Vanderbilt Co., Inc.

The preparation of colloidal clay dispersions is generally facilitated by use of water soluble inorganic phosphates, and particularly tetrasodium pyrophosphate. Laponite S, for example, is marketed as a powder which is believed to contain about 5% tetrasodium pyrophosphate. When used with synthetic clays, in particular, phosphate dispersants often permit the formation of very fluid and sometimes nearly clear colloidal dispersions at clay concentrations up to 5–10%. This permits the use of high concentrations of clay where required, and also facilitates mixture with aqueous macromolecular colloids where this is desirable.

The disadvantages of using clay as the only anionic reactant are similar to those encountered when it is used with nonionic polymeric reactants. These include the water sensitivity associated with clay, the relatively large amounts which are necessary to produce effective results (such as 2–10% of the continuous phase), and the tendency for dispersed globules to expand uncontrollably when clay in the continuous phase is the only effective reactant. In order to stabilize dispersions dependent on clay alone, it is generally necessary to add clay also to the base which forms the dispersed globules. This tends to produce globules of puffy consistency which lack the stability and flow properties attainable when using polymeric anionic reactants. Stability on aging is also unpredictable, and may vary with minor variations in clay composition, concentration of electrolytes, and change in temperature.

The preferred use of colloidal clay is in conjunction with an anionic macromolecular polyelectrolyte. Relatively small proportions of clay are then effective in enhancing the reactivity of the polymeric colloid, and the disadvantages of using clay as the sole reactant are substantially overcome.

It is well known that swelling clays of the smectite type tend to increase the viscosity of certain anionic colloids such as carboxymethyl cellulose. As used in the present compositions, the type of complex which is formed between such materials is believed to function more effectively than either of them alone when brought into contact with a cationic macromolecular colloid. When using a completely synthetic clay such as Laponite S, as little as 0.25% may be effective. Less reactive types, such as natural or refined natural clays, may require about 0.5–1.0%, based on the continuous phase.

Colloidal clay is often a useful adjunct because of other characteristics which are independent of its ionic reactivity or synergistic effects. For example, it can be an effective thickener at relatively low concentrations, when it is desirable to impart this property to a given composition. It is also useful in helping to maintain satisfactory hydration of dispersed globules where this might otherwise be difficult to achieve.

NONIONIC REACTION MODIFIERS

The activity of strongly reactive ionic colloids can be sufficiently great to induce some form of dehydration of the insolubilized globules. On a minor scale this may be indicated by shriveling of the globules, or undesirable flow of liquids from globules to continuous medium. More severe dehydration may result in complete collapse of the globules, with formation of irregular shreds.

One means of countering dehydration is to use a portion of polymeric colloid containing nonionic hydrophilic groups. For example, in place of a colloid solubilized entirely by anionic groups, one may employ a polymer which contains both anionic and nonionic groups, such as carboxymethyl hydroxypropyl cellulose.

In commercial practice one is limited by the fact that most polymers are either ionic or nonionic, with relatively few hybrids available. I have found, however, that improved hydration and globule strength can also be attained whenever necessary by simple mixtures of ionic and nonionic colloids. The use of mixed polymers is especially appropriate in the dispersed globules. The relative proportion of nonionic to ionic colloid may be small (such as 10–15%) when maximum particle size is required, or as much as 50–75% or more when smaller particles are satisfactory Exemplary of nonionic colloids which can be mixed advantageously with ionic colloids in the dispersed phase are the alkyl and hydroxyalkyl ethers of polysaccharides, such as methyl cellulose, methyl hydroxypropyl cellulose, hydroxyethyl cellulose, hydroxyethyl guar. Hydroxyethyl derivatives of polysaccharides are often more advantageous than other nonionic types.

In the continuous medium it is generally necessary to use nonreactive colloids more cautiously in order to avoid reducing globule strength. In some instances, however (see Example VII), small proportions of an anionic-nonionic colloid have been found to improve particle strength. It is believed that a hybrid of this kind may increase penetration of the globule by the reactive continuous medium, thus increasing wall strength.

APPLICATIONS

In the majority of instances the present aqueous dispersions will contain an aqueous component in addition to the ionic reactants necessary to produce the required phase separation. This component can be characterized as a "payload" which defines the use of the composition.

A major application is in the production of multicolored or textured coatings, wherein the payload is an aqueous film forming composition. For example, some of the globules may be colored differently from others and on application to a surface form a pointillistic design. Alternatively the globules may be colored differently from an aqueous film forming polymer contained in the continuous medium, and on application the composition may produce a mottled or striped appearance, depending on the method of application by brush, roller, or other type of tool. When varicolored coatings are not desired, unique textured coatings of a single color can be applied in a one-coat operation, where production of similar effects would normally require several coating operations.

It is often advantageous to use in the continuous phase a substantially transparent coating material. On application this phase can thus deposit a gloss or semi-gloss film which can partially or completely overlay an opaque film which is simultaneously deposited by the discrete globules. Unique color effects are obtained if the overlying film contains a transparent colorant. A special variation involves use in the continuous phase of light reflective elements such as glass beads or irregularly shaped particles which can be bound in place by the clear film forming material. Such compositions are useful as reflective paints in applications requiring high visibility.

Either or both phases may contain metallic particles such as metallic powders, flakes or fibers, and various other particled materials such as cellulose or asbestos fibers. Each phase can comprise various filler or extender components as well as pigments, defoamers, coalescing agents and the like, such as those commonly used in coating applications.

As the film forming polymer one can use a wide variety of water thinnable film formers including polymer latexes, aqueous solution coatings, and waterborne emulsions of water immiscible polymers or polymer solutions in water immiscible solvents. Latexes and water soluble film formers have the advantage of eliminating odors and fire hazards associated with volatile organic solvents. For example, among the latexes which can be used are polyacrylic, polyvinyl acetate, polyvinyl chloride, polystyrene, natural and synthetic rubber, and various copolymers such as vinyl acetate-acrylic emulsions. Other emulsions useful as film formers include emulsified oils, alkyds, epoxy resins, polyurethanes, and asphalt.

Solvent content can also be reduced without complete elimination by using emulsions of solvent containing coating materials. When such emulsions are incorporated into the present aqueous dispersions, volatile organic solvent content can be reduced to a fraction of that which is required for conventional solvent coatings. Polymer solutions such as alkyds, nitrocellulose, styrene-butadiene are among the water immiscible vehicles which can be emulsified and dispersed according to the present invention.

The coating films may form by simple air drying, or may require heating at an elevated temperature for effective film formation. Exemplary of the latter are the heat reactive thermosetting polymers, and heat fusible polymers such as polytetrafluoroethylene and the vinyl dispersion resins. By use with a suitable plasticizer emulsion, the dispersion resins can be dispersed in water and aggregated into visually distinguishable globules without the need for volatile organic solvents.

A second application is in the production of decorative fire resistant ceramic glazes. In this instance the globules, or both globules and continuous medium, contain a ceramic composition such as ceramic frit or non-fritted ceramic minerals, which are capable of fusing at an elevated temperature. Compositions of this kind make possible a great variety of decorative effects in heat resistant finishes, which can be similar in appearance to those produced with ordinary organic coatings.

Unique decorative effects are likewise obtained in forming paper products, such as sheets, cartons, etc., when the globules of the present dispersions contain paper pulp which is colored differently from the aqueous pulp slurry surrounding them, or from other pulp containing globules. The dispersions are similarly applicable to production of many kinds of self-supporting webs or matrices by compacting together various kinds of fibers or granules such as cellulosic fibers, asbestos fibers, glass fibers, synthetic polymer fibers, cellulosic granules, or sawdust. Globules containing such materials can be used either with or without polymeric binders to form sheets or boards such as asbestos board, cellulosic fiber board, imitation cork, and various kinds of nonwoven fabrics.

After formation of globules from any desired waterborne material, it is also feasible to remove the continuous aqueous medium and convert the globules to dry granules of the desired material. Granules can thus be made which have some desired property not present in the starting material, such as changed consistency, reduced toxicity, delayed solubility, improved dusting characteristics, etc. The dispersions can also be used to form granules containing plastic, ceramic, or metal powders which can be fused together to form molded objects. Similarly, the granules can be used as a powder coating, or as color concentrates for dispersion in other coating or molding compositions.

For example, the present dispersions can be used:

a. to form granules from a waterborne insecticide, to reduce its toxicity during handling, b. to reduce the solubiity of a fertilizer and give it delayed solubility characteristics, c. to reduce the dusting properties of finely divided solids such as diatomaceous earth, asbestos, d. to convert finely divided pigments into more easily handled granular color concentrates, as for use in plastic or rubber molding, e. to convert a waterborne polymer emulsion or suspension into dry granules for use as a powder coating or molding composition, f. to form aqueous globules or dry granules of waterborne odorants or flavorants.

ADVANTAGES OF IONIC DISPERSIONS

A distinguishing characteristic of the present ionic dispersions is their adaptability to a wider variety of applications and ability to use a wider scope of starting materials than those of the prior art.

In the prior art, for example, the attainment of adequate globule strength and stability generally required considerable selectivity in choosing an acceptable latex for use in coating compositions. Often two different latexes were required, one for the globules which was somewhat reactive with the insolubilizing agent, and another for the continuous medium which was not reactive with the insolubilizing agent.

In the present system the principal requirement is that the latex used in each phase should be compatible with the colloid used in that phase. This is often attainable with a single latex which is compatible with both phases, and different kinds of polymers are readily usable. The preferred latexes are those polymerized with surfactants which are at least partially nonionic.

In preparing compositions for different applications, it is also important to be able to produce a variety of compositions, such as those having different viscosities and flow properties, and different sizes and consistencies of discrete globules. For example, compositions most suitable for brushing or roller coating of pointillistic patterns will have a continuous medium of higher viscosity than that which is satisfactory for spray application. Compositions designed for striping will desirably have a less viscous outer medium than those required for pointillistic effects. The production of textured effects requires larger and harder globules than those desirable for smooth surface coatings.

By means of the present ionic reaction system it is possible to produce a wide range of stable dispersions containing globules with good shear resistance, and having a variety of different globule consistencies and viscosities of dispersing media, which were difficult or impossible to attain with previous systems. This makes it possible to attain various objectives, such as brushing and roller coating of pointillistic patterns, production of striping patterns by brushing, and of mottled patterns by roller coating, which heretofore were not practically attainable.

Prior dispersions have been dependent in large measure or in many cases completely on the insolubilization properties of colloidal clay. To produce globules of moderate size, for instance, about 2-10% of clay was required in the continuous phase. Deleterious effects resulting from high clay concentration include lengthening of film drying time and introduction of water sensitivity into the dry film. By means of the present ionic reactions it is possible to reduce clay concentration to 1% or lower, or even to use none at all, with resulting improvement in drying properties. For comparable globule size and film thickness, reduction in drying time of 50% or more is readily attainable.

PRE-REACTION OF DISPERSION BASE

When maximum globule size and strength are to be obtained, it is often desirable to increase the viscosity of the dispersion base (such as a paint base) before dispersion, by adding to it a minor portion of reactive ionic colloid which is opposite in charge to that of the macromolecular polyelectrolyte it comprises. For example, if a paint base is to contain a cationic macromolecular colloid, an appropriate agent for thickening it will be an anionic reactant, and preferably an anionic polyelectrolyte. The preferred reactants include polyelectrolytes designed to function as surfactants as well as the very high viscosity macromolecular colloids. In many instances a blend of different kinds of anionic reactants is more effective than a single reactant; for example, the anionic reactants may include one containing sulfonic groups, and others containing less reactive anions.

In preparing dispersions of paint bases, anionic polymeric surfactants are also advantageous in that they facilitate pigment dispersion and help to stabilize the latex against flocculation. They are preferably added during initial pigment dispersion, before addition of the cationic macromolecular colloid.

The desired quantity of reactive agent is that which thickens the dispersion base, but is sufficient to react with only part of the macromolecular polyelectrolyte of opposite charge. The appropriate amount is easily determined by experiment, as the use of too much reactant produces a dispersion of lower viscosity, rather than a uniform composition of higher viscosity than the starting material.

PREPARATION OF DISPERSIONS

The dispersions are prepared by merely adding to one another the desired proportions of each phase, and stirring with moderate mechanical agitation to produce the desired globule size. Ordinary paddle type agitators are satisfactory, with stirring rates of about 100 to several hundred revolutions per minute, depending on the desired globule size. More rapid stirring reduces the average globule size. The base which forms the globules can be added in several increments or all at once.

In preparing compositions designed to produce multicolor effects, such as multicolor coatings or glazes, it is generally convenient to prepare dispersions of each color separately, and mix these dispersions in desired proportion. It is also satisfactory to make multicolor dispersions directly by adding bases of different color successively to the dispersing medium, stirring after each addition to produce the desired discrete globules.

A slightly different procedure can be used if the final continuous medium is to be quite viscous, as in the production of dispersions for brush or roller application. Then it is often advantageous to form an initial dispersion in which the continuous medium is relatively low in viscosity, and contains a relatively high proportion of reactive ionic colloid. A second more viscous medium can then be added which may contain a lower proportion of reactive colloid, or even none at all. This minimizes the amount of stirring required in the presence of a viscous medium. In event a colored pigment or extender pigment is to be used in the continuous medium, it is convenient to add them in this second increment, minimizing the possible absorption of pigments by the discontinuous phase.

The phase relationships of the dispersions may be either cation-in-anion, or anion-in-cation. Cation-in-anion dispersions have the current advantage of a greater availability of a variety of anionic polymers which can be used as reactants and thickeners in the continuous medium. This permits more effective variation of the size and consistency of the dispersed globules. Generally this type of dispersion has also been found to permit a higher dispersion ratio of globules to continuous phase than anion-in-cation dispersions. By suitable choice of reactants, the ratio of dispersed to continuous phase can be as high as 4:1 or greater. Anion-in-cation dispersions are more suitable where dispersion ratios of 1:1 or lower are satisfactory, or where particularly fluid dispersed globules are desirable.

EXAMPLE I

Red-yellow coating composition containing ionic film formers

No additional payload.

Composition A—Red dispersion

| | Parts by Weight |
|---|---|
| Cationic starch derivative, 5% solution in water (CATO starch, National Starch & Chemical Corp.) | 45.5 |

-continued

| | Parts by Weight |
|---|---|
| Cationic cellulose ether, 2% solution in water (UCON Quatricel CCE-25M, Union Carbide Corp.) | 50.0 |
| Red iron oxide pigment | 4.5 |
| | 100 |

The pigment was dispersed in the cationic starch solution, then blended with the cationic cellulose solution. The resulting red coating composition was converted into discrete globules by dispersing it in an equal weight of an aqueous anionic dispersing medium containing water and 0.5% sodium carboxymethyl cellulose (CMC 7H3SF, Hercules Inc.)
0.125% sodium condensed naphthalene sulfonate (Lomar D, Nopco Chemical Division, Diamond Shamrock Chemical Co.)

Composition B—Yellow dispersion

This was the same as composition A, except that yellow iron oxide pigment was substituted for red iron oxide pigment.

Composition C—Red-yellow coating composition

Equal parts of compositions A and B were intermixed to produce a red-yellow coating composition. This was applied to a substrate with a standard spray gun, to give a red-yellow multicolor coating. Either small or large color patterns up to ¼ inch in size could be obtained by variation in spraying pressures.

In this example the cationic and anionic reactants are the only film forming materials.

EXAMPLE II

Blue-white coating composition

Payload—acrylic copolymer emulsion.

Composition A—White dispersion

| | Parts by Weight |
|---|---|
| Acrylic copolymer emulsion, 40% solids (Polyco 2719, Borden Chemical Division, Borden Inc.) | 35.7 |
| Titanium dioxide | 10.7 |
| Nonyl phenyl polyethylene glycol ether (Tergitol NPX, Union Carbide Corp.) | 0.2 |
| Cross-linked sulfonated polystyrene, 3% solution in water (2166-86, National Starch & Chemical Corp.) | 26.8 |
| Water | 26.6 |
| | 100 |

This white latex coating composition was prepared in the usual manner, then converted into discrete globules by dispersing it with stirring in an equal weight of a cationic aqueous dispersing medium containing water and 0.5% cationic cellulose ether (UCON Quatricel CCE-25M, Union Carbide Corp.)
1% cationic acrylic polymer emulsion solids (Rhoplex PR-26, Rohm & Haas Co.)

Composition B—Blue dispersion

This was the same as composition A, except that the white paint was tinted before dispersion by blending into it 1% by weight of a phthalo blue pigment dispersion.

Composition C—Blue-white coating composition

Equal parts of compositions A and B were intermixed and applied with standard spray gun to give a blue-white multicolor coating. The dried film was characterized by relatively large pattern and low texture, with color specks up to ¼ inch in size.

This example represents dispersions containing anionic reactant in the dispersed phase and cationic reactant in the continuous phase.

EXAMPLE III

Red-blue coating composition

Payload—vinyl acetate copolymer emulsion.

Composition A—Red cationic coating composition

| | Parts by Weight |
|---|---|
| Vinyl acetate copolymer emulsion, 55% solids (Polyco 804, Borden Chemical Division, Borden Inc.) | 23.6 |
| Calcium carbonate | 8.0 |
| Red iron oxide | 4.0 |
| Nonyl phenyl polyethylene glycol ether (Tergitol NPX, Union Carbide Corp.) | 0.2 |
| Ammonium hydroxide (28% NH3) | 0.8 |
| Cationic cellulose ether, 2% solution in water (UCON Quatricel CCE-25M) | 47.4 |
| Water | 16.0 |
| | 100 |

Composition B—Blue cationic coating composition

This was the same as composition A except that red iron oxide was eliminated, substituting therefor 4 additional parts of calcium carbonate and 0.5 part of phthalo blue pigment dispersion.

Composition C—Anionic dispersing medium

| | |
|---|---|
| Sodium carboxymethyl cellulose, 2% solution in water (CMC 7H3SF, Hercules Inc.) | 30.0 |
| Sodium condensed naphthalene sulfonate, 25% solution in water (Lomar D, Nopco Chemical Division, Diamond Shamrock Chemical Co.) | 0.5 |
| Vinyl acetate copolymer emulsion, 55% solids (Polyco 804, Borden Chemical Division, Borden Inc.) | 22.5 |
| Ammonium hydroxide (28% NH3) | 0.9 |
| Water | 46.1 |
| | 100 |

Composition D—Red dispersion

Composition A was dispersed by stirring in an equal weight of composition C.

Composition E—Blue dispersion

Composition B was dispersed by stirring in an equal weight of composition C.

Composition F—Red-blue coating composition

Equal parts of compositions D and E were intermixed and applied with standard spray gun, giving a semi-glossy red-blue multicolor coating, with color specks up to ¼ inch in size.

In this example both phases contain a film forming latex in addition to the polymeric ionic reactants.

EXAMPLE IV

White-black coating composition

Payload—vinyl acetate-acrylic copolymer emulsion.

Composition A—Anionic dispersing medium

|  | Parts by Weight |
|---|---|
| Sodium carboxymethyl cellulose, 2% solution in water (CMC 7H, Hercules Inc.) | 13.0 |
| Sodium polystyrene sulfonate, 2% solution in water (VERSA-TL 700, National Starch and Chemical Corp.) | 9.0 |
| Sodium condensed naphthalene sulfonate, 25% solution in water (Lomar D, Nopco Chemical Division, Diamond Shamrock Chemical Co.) | 0.2 |
| Synthetic hectorite clay, 8% colloidal dispersion in water (Laponite S, Laporte Industries Ltd.) | 8.0 |
| Water | 69.8 |
|  | 100 |

Compositions B, C—Single color dispersions of cationic bases in anionic dispersing medium

|  | B | C |
|---|---|---|
| Vinyl acetate-acrylic copolymer emulsion, 55% solids (Amsco Res 3011, American Mineral Spirits Co. Division, Union Oil Co. of California) | 39.3 | 39.3 |
| Titanium dioxide | 11.8 | — |
| Black iron oxide | — | 11.8 |
| Aqueous solution of mixed chelating agents, 26% active ingredient (Chelon 62, Cowles Chemical Co.) | 0.04 | 0.04 |
| Sodium condensed naphthalene sulfonate, 25% solution in water (Lomar D, Nopco Chemical Division, Diamond Shamrock Chemical Co.) | 0.24 | 0.40 |
| Ammonium hydroxide (28% $NH_3$) | 0.35 | 0.35 |
| Water | 10.77 | 10.61 |
| Cationic cellulosic derivative, 2% solution in water (Polymer Jr-30M, Union Carbide Corp.) | 37.5 | 37.5 |
| Total cationic base | 100 | 100 |
| Composition A | 50 | 50 |

The cationic bases were prepared by making latex paints of each color in the usual manner, then adding the cationic cellulosic polymer. Dispersions of each color were then prepared by dispersing the cationic base in the anionic dispersing medium and stirring to produce the desired particle size.

Composition D—White-black coating composition

Equal parts of compositions C and D were intermixed and applied by spraying to give a sharply contrasting multicolor coating. The pattern size varied with the size of the orifice, but many color flecks as large as ½ inch were obtained by using a spray orifice of 0.070".

In this example globule strength was enhanced by use of the high molecular weight condensed naphthalene sulfonate as anionic polyelectrolyte in the dispersed globules, to react with a portion of the cationic polyelectrolyte. It also serves as a pigment dispersant.

EXAMPLE V

Yellow-brown coating composition for striped effects

Payload—acrylic emulsion.

Composition A—Anionic dispersing medium

|  | Parts by Weight |
|---|---|
| Sodium carboxymethyl cellulose, 2% solution in water (CMC 7H3SF, Hercules Inc.) | 13.1 |
| Sodium polystyrene sulfonate, 2% solution in water (VERSA-TL 700, National Starch and Chemical Corp.) | 8.8 |
| Synthetic hectorite clay, 8% colloidal dispersion in water (Laponite S, Laporte Industries Ltd.) | 8.1 |
| Water | 70.0 |
|  | 100 |

Composition B—Brown latex coating composition

|  |  |
|---|---|
| Acrylic polymer emulsion, 50% solids (Rhoplex AC-388, Rohm & Haas Co.) | 57.5 |
| Maleic adducted linoleic ester of styrene allyl alcohol copolymer, 63.5% solution in water/diethylene glycol monobutyl ether (RF-9069, Monsanto Co.) | 1.4 |
| Ammonium hydroxide (28% $NH_3$) | 0.05 |
| Calcium carbonate | 13.9 |
| Talc | 9.9 |
| Brown iron oxide | 4.0 |
| Lampblack | 0.4 |
| Anionic polymeric dispersing agent, 25% solids (Tamol 731, Rohm & Haas Co.) | 1.0 |
| Propylene glycol | 1.9 |
| 2,2,4-trimethyl-1,3-pentanediol monoisobutyrate | 1.9 |
| Water | 8.05 |
|  | 100 |

Composition C—Yellow-brown coating composition

|  |  |
|---|---|
| Acrylic polymer emulsion, 50% solids (Rhoplex AC-388, Rohm & Haas Co.) | 57.7 |
| Titanium dioxide | 11.5 |
| Yellow iron oxide | 11.5 |
| Sodium tripolyphosphate, 10% solution in water | 0.1 |
| Aqueous solution of mixed chelating agents, 26% active ingredient (Chelon 62, Cowles Chemical Co.) | 0.1 |
| Propylene glycol | 0.6 |
| 2,2,4-trimethyl-1,3-pentanediol monoisobutyrate | 0.6 |
| Water | 11.5 |
| Cationic guar gum, 2% solution in water (Gendriv 162, General Mills Chemicals, Inc.) | 2.9 |
| Quaternized vinylpyrrolidone copolymer, 15% solution in water (Gafquat 755, GAF Corp.) | 3.5 |
| Total cationic base | 100 |
| Composition A | 67 |
| Composition B | 133 |

The yellow latex paint was prepared in the customary manner, after which the cationic reactants were added. Yellow globules were formed by dispersing the resulting cationic base in the clear anionic dispersing medium (composition A). The brown latex paint (composition B) was then added to form a dispersion of yellow globules in a continuous brown coating medium.

Composition C was applicable by brush to porous or nonporous surfaces to yield a one-coat striated finish which was visibly multicolored. Application by roller coat gave a two-color effect which was mottled in appearance.

EXAMPLE VI

White-brown coating composition for striped effects

Payload—vinyl acetate-acrylic copolymer emulsion.

|  | Parts by Weight |
|---|---|
| Vinyl acetate-acrylic copolymer emulsion, 55% solids (Amsco Res 3011, American Mineral Spirits Co. Division, Union Oil Co. of California) | 43.7 |
| Titanium dioxide | 21.9 |
| Cationic corn starch derivative, 3% solution in water (CATO 8, National Starch and Chemical Corp.) | 3.5 |
| Ammonium hydroxide (28% NH3) | 0.4 |
| Aqueous solution of mixed chelating agents, 26% active ingredient (Chelon 62, Cowles Chemical Co.) | 0.1 |
| Water | 4.2 |
| Cationic cellulosic derivative, 2% solution in water (Polymer Jr-30M, Union Carbide Corp.) | 21.0 |
| Hydroxyethyl cellulose, 2% solution in water (Cellosize QP-100M, Union Carbide Corp.) | 5.2 |
| Total cationic base | 100 |
| Composition A of Example V | 80 |
| Composition B of Example V | 80 |

This was prepared in the same manner as Example V. The average globule size was larger than in the former example, and on application by brush the present composition produced a more pronounced striping effect. Many globules were as large as 600–800 microns.

The latex used in this example is more compatible with cationic polymers than Rhoplex AC-388. The cationic cellulosic polymer used here is also more reactive than cationic guar gum or vinylpyrrolidone copolymer. Cationic starch serves primarily as a pigment dispersant, and was incorporated in the initial latex paint preparation before adding the other cationic polymers.

EXAMPLE VII

White-red coating composition for pointillistic effects

Payload—vinyl acetate-acrylic copolymer emulsion.

Composition A—Anionic dispersing medium

|  | Parts by Weight |
|---|---|
| Sodium carboxymethyl cellulose, 2% solution in water (CMC 7H, Hercules Inc.) | 25.0 |
| Sodium polystyrene sulfonate, 2% solution in water (VERSA-TL 700, National Starch and Chemical Corp.) | 12.5 |
| Sodium carboxymethyl hydroxypropyl cellulose, 3% solution in water (Klucel 4G, Hercules Inc.) | 5.0 |
| Water | 57.5 |
|  | 100 |

Composition B—Anionic dispersing medium

| Composition A | 83.3 |
|---|---|
| Water | 16.7 |
|  | 100 |

Composition C—Colorless latex coating composition

|  |  |
|---|---|
| Vinyl acetate-acrylic copolymer emulsion, 55% solids (Amsco Res 3011, American Mineral Spirits Co. Division, Union Oil Co. of California) | 56.4 |
| Maleic adducted linoleic ester of styrene allyl alcohol copolymer, 63.5% solution in water/diethylene glycol monobutyl ether (RF-9069, Monsanto Co.) | 10.7 |
| Ammonium hydroxide (28% NH3) | 0.5 |
| Talc | 24.1 |
| Sodium condensed naphthalene sulfonate, 25% solution in water (Lomar D, Nopco Chemical Division, Diamond Shamrock Chemical Co.) | 0.7 |
| Water | 7.6 |
|  | 100 |

Compositions D, E—Single color dispersions of cationic bases in anionic dispersing medium

|  | D | E |
|---|---|---|
| Vinyl acetate-acrylic copolymer emulsion, 55% solids (Amsco Res 3011, American Mineral Spirits Co. Div., Union Oil Co. of California) | 38.4 | 36.6 |
| Titanium dioxide | 19.2 | 9.1 |
| Calcium carbonate | — | 9.1 |
| Barium lithol red pigment dispersion, 53% solids | — | 4.8 |
| Anionic phosphate ester dispersant, 25% active ingredients (Ulasperse 994-B, Ultra Adhesives Inc.) | 0.08 | 0.07 |
| Ammonium hydroxide (28% NH3) | 0.35 | 0.33 |
| Water | 4.57 | 4.2 |
| Cationic cellulosic derivative, 2% solution in water (Polymer Jr-30M, Union Carbide Corp.) | 18.7 | 17.9 |
| Hydroxyethyl cellulose, 2% solution in water (Cellosize QP-100M, Union Carbide Corp.) | 18.7 | 17.9 |
| Total cationic base | 100 | 100 |
| Composition A | — | 33 |
| Composition B | 33 | — |

These white and red dispersions were prepared in the same manner as the white and black dispersions of Example IV, making latex paints of each color, adding cationic and nonionic cellulosic derivatives, and dispersing in an anionic dispersing medium.

Composition F—White-red coating composition for pointillistic effects

| Composition D | 52 |
|---|---|
| Composition E | 28 |
| Composition C | 20 |

Intermixing the colored globule dispersions and colorless latex paint yielded a multicolor coating composition which could be brushed on a smooth surface to give a relatively thin film with adequate one-coat hiding. The pattern was a fine grain type, but clearly multicolored as seen by the naked eye, and substantially nondirectional in appearance.

EXAMPLE VIII

White-red coating composition for pointillistic effects

Payload—vinyl acetate-acrylic copolymer emulsion.

Composition A—Anionic dispersing medium

|  | Parts by Weight |
|---|---|
| Sodium carboxymethyl cellulose, 2% solution in water (CMC 7H, Hercules Inc.) | 20.0 |
| Cross-linked acrylic polymer emulsion, alkali swellable, 20% dispersion in water (Acrysol ASE-108, Rohm & Haas Co.) | 0.5 |
| Sodium condensed naphthalene sulfonate, 25% solution in water (Lomar D, Nopco Chemical Division, Diamond Shamrock Chemical Co.) | 0.2 |
| Synthetic hectorite clay, 8% colloidal dispersion in water (Laponite S, Laporte Industries Ltd.) | 8.0 |
| Ammonium hydroxide (28% NH3) | 0.1 |

-continued

| | Parts by Weight |
|---|---|
| Water | 71.2 |
| | 100 |

Composition B—Colorless latex coating composition

| | |
|---|---|
| Vinyl acetate-acrylic copolymer emulsion, 55% solids (Amsco Res 3011, American Mineral Spirits Co. Div., Union Oil Co. of California) | 56.4 |
| Maleic adducted linoleic ester of styrene allyl alcohol copolymer, 63.5% solution in water/diethylene glycol monobutyl ether (RF-9069, Monsanto Co.) | 5.9 |
| Ammonium hydroxide (28% NH$_3$) | 0.6 |
| Talc | 24.2 |
| Sodium condensed naphthalene sulfonate, 25% solution in water (Lomar D, Nopco Chemical Division, Diamond Shamrock Chemical Co.) | 0.7 |
| Water | 12.2 |
| | 100 |

Compositions C, D—Single color dispersions of cationic bases in anionic dispersing medium

| | C | D |
|---|---|---|
| Vinyl acetate-acrylic copolymer emulsion, 55% solids, (Amsco Res 3011, American Mineral Spirits Co. Div., Union Oil Co. of California) | 38.4 | 38.4 |
| Titanium dioxide | 19.2 | 7.7 |
| Red iron oxide | — | 11.5 |
| Anionic phosphate ester dispersant, 25% active ingredients (Ulasperse 994-B, Ultra Adhesives Inc.) | 0.08 | 0.08 |
| Aqueous solution of mixed chelating agents, 26% active ingredient (Chelon 62, Cowles Chemical Co.) | 0.4 | — |
| Trisodium N—hydroxyethyl ethylenediamine triacetate, 41% in water | — | 0.08 |
| Ammonium hydroxide (28% NH$_3$) | 0.4 | 0.4 |
| Water | 4.38 | 4.38 |
| Cationic cellulosic derivative, 2% solution in water (Polymer JR-30M, Union Carbide Corp.) | 26.2 | 26.2 |
| Hydroxyethyl cellulose, 2% solution in water (Cellosize QP-100M, Union Carbide Corp.) | 11.3 | 11.3 |
| Total cationic base | 100 | 100 |
| Composition A | 31.3 | 31.3 |

White and red dispersions were prepared by stirring each cationic base in the dispersing medium (composition A). After attaining approximately the desired particle size, composition B was added with sufficient stirring to give a uniform mixture.

| | | |
|---|---|---|
| Composition B | 31.3 | 31.3 |

Composition E—White-red coating composition for pointillistic effects

| | |
|---|---|
| Composition C | 67 |
| Composition D | 33 |

Intermixing the colored globule dispersions yielded a multicolor coating composition which could be brushed on a smooth surface to give a multicolored film with adequate one-coat hiding. The pattern was substantially non-directional in appearance, with many globules as large as 2 mm. or larger.

EXAMPLE IX

Yellow-blue-green ceramic coating composition

Payload—ceramic frit.

Composition A—Ceramic base

| | |
|---|---|
| Porcelain ceramic frit (XF-30, Ferro Corp.) | 78.4 |
| Tetrasodium pyrophosphate | 0.05 |
| Potassium carbonate | 0.2 |
| Water | 21.35 |
| | 100 |

Compositions B—Anionic dispersing medium

| | |
|---|---|
| Sodium carboxymethyl cellulose, 2% solution in water (CMC 7H, Hercules Inc.) | 18 |
| Sodium polystyrene sulfonate, 2% solution in water (VERSA-TL 700, National Starch and Chemical Corp.) | 17 |
| Colloidal silica, 30% solids in water (Ludox SM-30, Du Pont de Nemours & Co.) | 6 |
| Crude natural water swellable clay, 5% dispersion in water | 5 |
| Water | 54 |
| | 100 |

Compositions C, D, E—Single color dispersions of cationic bases in anionic dispersing medium

| | C | D | E |
|---|---|---|---|
| Composition A | 78.7 | 78.7 | 78.7 |
| Titanium dioxide (RA-10, Titanium Pigment Division, NL Industries Inc.) | 0.8 | — | — |
| Yellow ceramic colorant (N-955, Pemco Division, SCM Corp.) | 7.1 | — | — |
| Blue ceramic colorant (N-1054, Pemco Division, SCM Corp.) | — | 7.9 | — |
| Green ceramic colorant (20101, Ferro Corp.) | — | — | 7.9 |
| Quaternized vinylpyrrolidone copolymer, 15% solution in water (Gafquat 755, GAF Corp.) | 1.6 | 1.6 | 1.6 |
| Cationic cellulosic derivative, 2% solution in water (Polymer JR-30M, Union Carbide Corp.) | 11.8 | 11.8 | 11.8 |
| Total cationic base | 100 | 100 | 100 |
| Composition B | 23.6 | 23.6 | 23.6 |

The cationic bases of different color were prepared by mixing the colorants with the ceramic base, then adding the cationic polymers. Dispersions of each color were then prepared by dispersion of the cationic base in the anionic dispersing medium.

Composition F—Yellow-blue-green ceramic coating composition

| | |
|---|---|
| Composition C (Yellow dispersion) | 35.7 |
| Composition D (Blue dispersion) | 35.7 |
| Composition E (Green dispersion) | 14.3 |
| Composition A (Ceramic base) | 14.3 |
| | 100 |

Composition F was doctored onto a primed steel plate, dried, and fused in a ceramic kiln at 1480° F. to give a multicolor ceramic coating in which the individual colors were readily distinguishable from one another by the naked eye.

EXAMPLE X

Red-yellow paper composition

Payload—paper pulp.

Composition A—Cationic dispersing medium

| | |
|---|---|
| Paper pulp, 10% dispersion in water | 30.0 |
| Cationic cellulosic derivative, 1.5% solution in water (Polymer JR-30M, Union Carbide Corp.) | 16.8 |
| Water | 53.2 |
| | 100 |

Compositions B, C—Anionic paper slurries

| | B | C |
|---|---|---|
| Paper pulp, 10% dispersion in water | 30 | 30 |
| Sodium carboxymethyl cellulose, 2% solution in water (CMC 7H3SF, Hercules Inc.) | 9 | 9 |
| Colloidal magnesium aluminum silicate derived from saponite, 5% dispersion in water (Veegum T, R. T. Vanderbilt Co., Inc.) | 10 | 10 |
| Red iron oxide | 1 | — |
| Yellow iron oxide | — | 1 |
| Sodium polystyrene sulfonate, 2% solution in water (VERSA-TL 700, National Starch and Chemical Corp.) | 6 | 6 |
| Water | 44 | 44 |
| | 100 | 100 |

Composition D—Red-yellow paper composition

| | |
|---|---|
| Composition A | 100 |
| Composition B | 10 |
| Composition C | 10 |

Compositions B and C were added successively to composition A, with stirring after each addition to break the colored compositions into globules of desired size.

Composition D was doctored onto a wire screen, and on drying at 180° F. yielded a multicolored paper sheet with red, yellow and white areas clearly distinguishable from one another. The pattern could be modified by squeezing the formed sheet between steel plates before drying, which tended to deform the colored globules.

I claim:

1. The coating composition of the process of:
   a. preparing at least one first flowable colored aqueous phase comprising a plurality of first colloid ions that have an aggregate charge that is either anionic or cationic;
   b. preparing a second flowable aqueous phase of a color different from that of said first aqueous phase, said second aqueous phase comprising a plurality of second colloid ions that have an aggregate charge opposite to that of said aggregate charge of said first colloid ions, said first and second colloid ions when intermixed capable of reacting to define a body of hydrated anionic-cationic complex of fluid to gelatinous consistency that is of substantially less volume than the combined volume of said first and second phases;
   c. intermixing said first and second phases to obtain said body of hydrated anionic-cationic complex that is disposed in a continuous aqueous phase, which continuous aqueous phase is what remains of said first and second phases after said anionic and cationic ions have reacted to form said hydrated anionic-cationic complex; and
   d. subdividing said body of hydrated anionic-cationic complex into a plurality of discrete globules of such size that the major portion thereof are visible to the naked eye, with said globules being dispersed in said continuous phase.

2. A coating composition of the process of claim 1 wherein at least one of said first and second ionic colloid comprises an aqueous macromolecular polyelectrolyte.

3. A coating composition of the process of claim 1 which further includes:
   e. a plurality of minute particles of a non-water soluble colorant initially suspended in said first aqueous phase that is incorporated in said globules as in integral part thereof.

4. A coating composition of this process of claim 1 in which a first part of said globules are of a first color and a second part of said globules are a second color different from said first color.

5. A coating composition of the process of claim 1 in which a water thinable film forming polymer is added to at least one of said first and second aqueous phases prior to the intermixing thereof.

6. A coating composition of the process of claim 1 which further includes:
   e. a water dispersible ceramic compound in said first aqueous phase that is incorporated into said globules.

7. A coating composition of the process of claim 1 which further includes:
   e. a slurry of particulate materials in said first aqueous phase selected from the group comprising cellulosic fibers, asbestos fibers, glass fibers, synthetic polymer fibers, cellulosic grannules and saw dust.

8. A coating composition of the process of claim 1 in which said first aqueous phase is anionic and said second aqueous phase is cationic.

9. A coating composition of the process of claim 1 in which said first aqueous phase is cationic and said second aqueous phase anionic.

10. A coating composition of the process of claim 1 in which said second aqueous phase contains both an organic anionic colloid and an inorganic anionic colloid.

11. A coating composition of the process of claim 10 in which said inorganic anionic colloid is a clay selected from the minerals characterized as smectites.

12. A coating composition of the process of claim 10 in which said inorganic anionic colloid is a synthetic water swellable clay.

13. A coating composition of the process of claim 12 in which said clay is present in said second phase of an amount of substantially between 0.10 percent and 1.0 percent of the weight of said second phase.

14. A coating composition of the process of claim 1 wherein said first aqueous phase contains a cationic reactant selected from the group consisting of onium derivatives of polysaccharides and synthetic polymers.

15. A coating composition of the process of claim 1 wherein said first aqueous phase contains a cationic reactant that is quaternary ammonium derivatives of cellulose.

16. A coating composition of the process of claim 1 wherein said second aqueous phase contains an anionic macromolecular polymer selected from the group consisting of polymers containing sulfonic groups and polymers containing sulfate groups.

17. A coating composition of the process of claim 1 wherein said second aqueous phase contains an anionic reactant that is a macromolecular acrylic polymer.

18. A coating composition of the process of claim 1 wherein said first aqueous phase includes both ionic and non-ionic macromolecular colloids.

19. A coating composition of the process of claim 1 wherein said first aqueous phase (also) contains a hydroxyalkyl derivative of a polysacchride.

20. A coating composition of the process of claim 1 wherein said first aqueous phase contains an aqueous macromolecular polyelectrolyte and further includes a reactant which is charged oppositely from said aqueous macromolecular polyelectrolyte, and said reactant sufficient in amount to increase the viscosity of said first aqueous phase but insufficient to neutralize the activity of said aqueous macromolecular polyelectrolyte.

21. A coating composition of the process of claim 20 wherein said oppositely charged reactant comprises a polyelectrolyte containing sulfonic groups.

22. A coating composition of the process of claim 5 wherein said water thinable film forming polymer is a latex polyester.

23. A coating composition of the process of claim 1 wherein said first aqueous phase is different in color from said second aqueous phase.

24. A coating composition of the process of claim 1 in which said first aqueous phase contains a macromolecular polyelectrolyte selected from the group consisting of sulfonated, sulphated and carboxylated polymers, water soluble polyesters, maleinized oils, maleinized esters of styrene-allyl alcohol copolymers and carboxylated cellulosics.

25. A coating composition of the process of claim 1 in which a plurality of first aqueous phases of different colors are prepared separately and added separately to said second aqueous phase to obtain a plurality of bodies of said globules that are of a plurality of colors.

26. A coating composition of the process of claim 1 which includes the additional step of:
 e. adding a non-ionic colloid to at least one of said first and second flowable aqueous phases prior to the intermixing thereof to minimize dehydration of said body of hydrated anionic-cationic complex and said globules thereof.

27. A coating composition of the processes of claim 1 which includes the additional step of:
 e. adding water swellable clay to at least one of said first and second aqueous phases prior to the intermixing thereof to improve the drying time of said decorative coating when applied to a substrate.

28. A coating composition of the process of claim 1 which includes the additional step of:
 e. adding a slurry of particulate materials to at least one of said first and second phases prior to said intermixing thereof, said particulate materials selected from the group comprising cellulosive fibers, asbestos fibers, glass fibers, synthetic polymer fibers, asbestos cellulosive granules and saw dust, said particulate materials being entrapped in said body of hydrated anionic-cationic complex and said globules resulting from the subdividing thereof.

* * * * *